US008688425B2

(12) United States Patent
Oppert et al.

(10) Patent No.: US 8,688,425 B2
(45) Date of Patent: *Apr. 1, 2014

(54) TRANSPORT PROPERTY DATA CALCULATED FROM DERIVATIVE SEISMIC ROCK PROPERTY DATA FOR TRANSPORT MODELING

(75) Inventors: Shauna K. Oppert, Houston, TX (US);
Michael E. Farrell, Katy, TX (US);
Jonathan Stewart, Houston, TX (US);
Rene Jonk, Calgary (CA); Scott A. Barboza, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 325 days.

This patent is subject to a terminal disclaimer.

(21) Appl. No.: 12/933,030

(22) PCT Filed: Apr. 13, 2009

(86) PCT No.: PCT/US2009/040363
§ 371 (c)(1),
(2), (4) Date: Sep. 16, 2010

(87) PCT Pub. No.: WO2009/137228
PCT Pub. Date: Nov. 12, 2009

(65) Prior Publication Data
US 2011/0015912 A1    Jan. 20, 2011

Related U.S. Application Data

(60) Provisional application No. 61/126,616, filed on May 6, 2008.

(51) Int. Cl.
*G06G 7/48* (2006.01)

(52) U.S. Cl.
USPC .......................................................... 703/10

(58) Field of Classification Search
USPC .......................................................... 703/10
See application file for complete search history.

(56) References Cited

U.S. PATENT DOCUMENTS

| 4,926,394 A | 5/1990 | Doyen |
| 5,475,589 A | 12/1995 | Armitage |
| 5,487,001 A | 1/1996 | Neff |
| 5,638,269 A | 6/1997 | Fournier et al. |
| 5,764,515 A | 6/1998 | Guerillot et al. |
| 6,088,656 A | 7/2000 | Ramakrishnan et al. |

(Continued)

OTHER PUBLICATIONS

Oppert et al. (2006), "Lithofacies Prediction in Clastic Deep Water Reservoirs," *SEG, Expanded Abstracts* 25(1), pp. 1708-1711.

(Continued)

*Primary Examiner* — Hugh Jones
(74) *Attorney, Agent, or Firm* — ExxonMobil Upstream Research Company Law Dept.

(57) ABSTRACT

At least one transport property for a subsurface region is calculated from derivative seismic data by generating a model relating at least one derivative seismic rock property of a subsurface region to at least one transport property for the subsurface region. At least one transport property is calculated by applying the generated transport property model. Transport phenomena may be simulated with a transport model using at least one transport property generated by applying the model. A model describing evolution of the at least one transport property may be generated within the subsurface region over time, e.g., to facilitate basin modeling of the subsurface region.

8 Claims, 14 Drawing Sheets

(56) References Cited

U.S. PATENT DOCUMENTS

| | | | |
|---|---|---|---|
| 6,106,561 A * | 8/2000 | Farmer | 703/10 |
| 6,374,185 B1 | 4/2002 | Taner et al. | |
| 6,381,543 B1 | 4/2002 | Guerillot et al. | |
| 6,646,437 B1 | 11/2003 | Chitale et al. | |
| 6,950,786 B1 | 9/2005 | Sonneland et al. | |
| 7,716,028 B2 | 5/2010 | Montaron et al. | |
| 2007/0276639 A1 * | 11/2007 | Montaron et al. | 703/10 |

OTHER PUBLICATIONS

Oppert et al. (2004), "Sand/Shale Discrimination in Mixed-Impedance Reservoirs Using AVO Attributes," *SEG, Expanded Abstracts* 23(1), pp. 1495-1498.

Saltzer et al. (2005), "Predicting VShale and Porosity Using Cascaded Seismic and Rock Physics Inversion", *The Leading Edge* 24(7), pp. 732-736.

Saltzer et al. (2005), "Predicting Vshale and Porosity Using Cascaded Seismic and Rock Physics Inversion," *SEG, Expanded Abstracts* 24(1), pp. 1390-1392.

Saltzer et al. (2005), "Using Linear Combinations of Angle Stacks to Predict Band-Limited Porosity and Vshale," *SEG, Expanded Abstracts* 24(1), pp. 1303-1306.

International Search Report and Written Opinion, dated Jun. 10, 2009, PCT/US2009/40363.

Sheriff, R.E. (2002), "*Encyclopedic Dictionary of Applied Geopyhsics*," Fourth Edition, pp. 2, 4, 393 and 394.

* cited by examiner

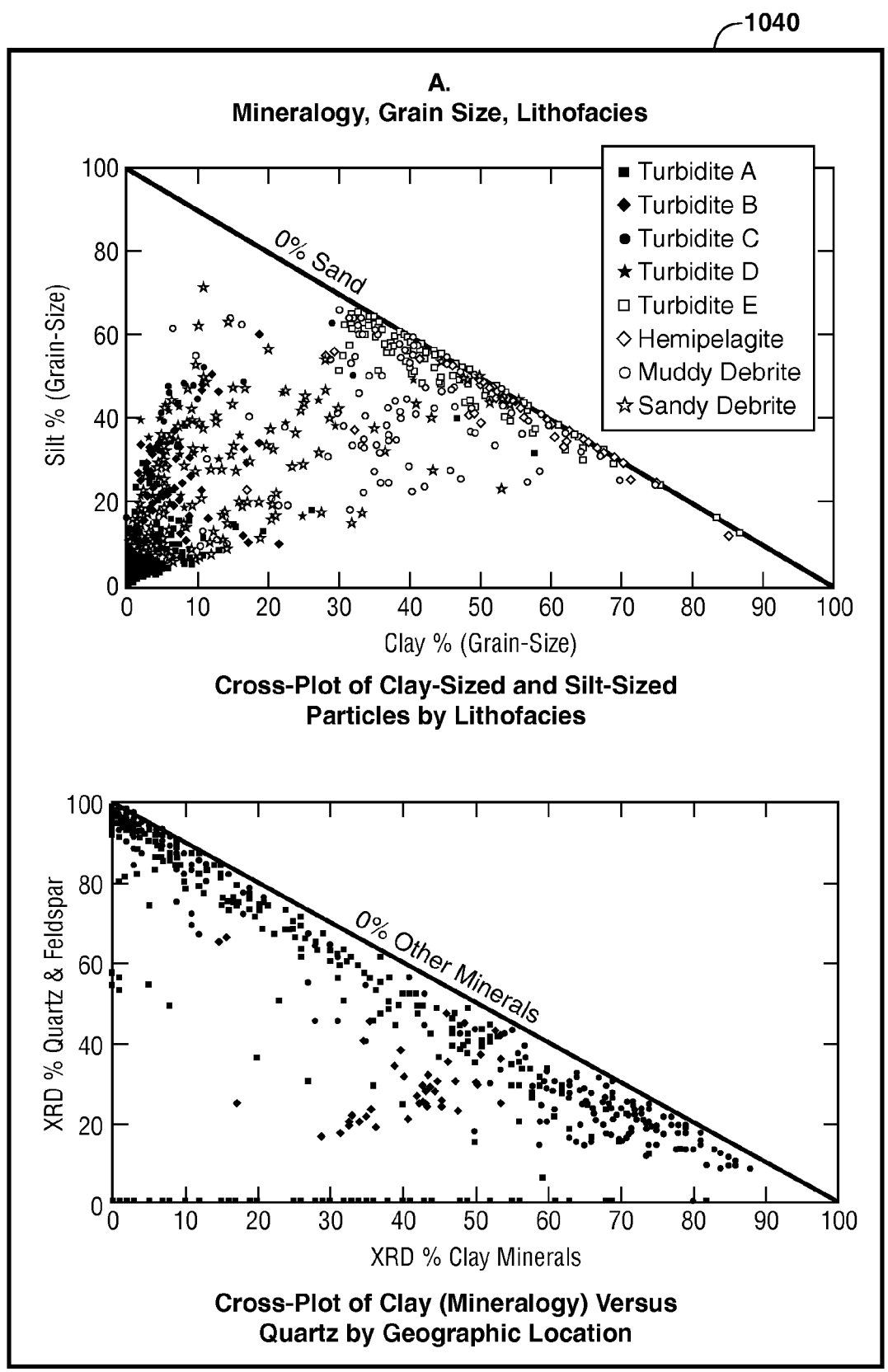
FIG. 10B1

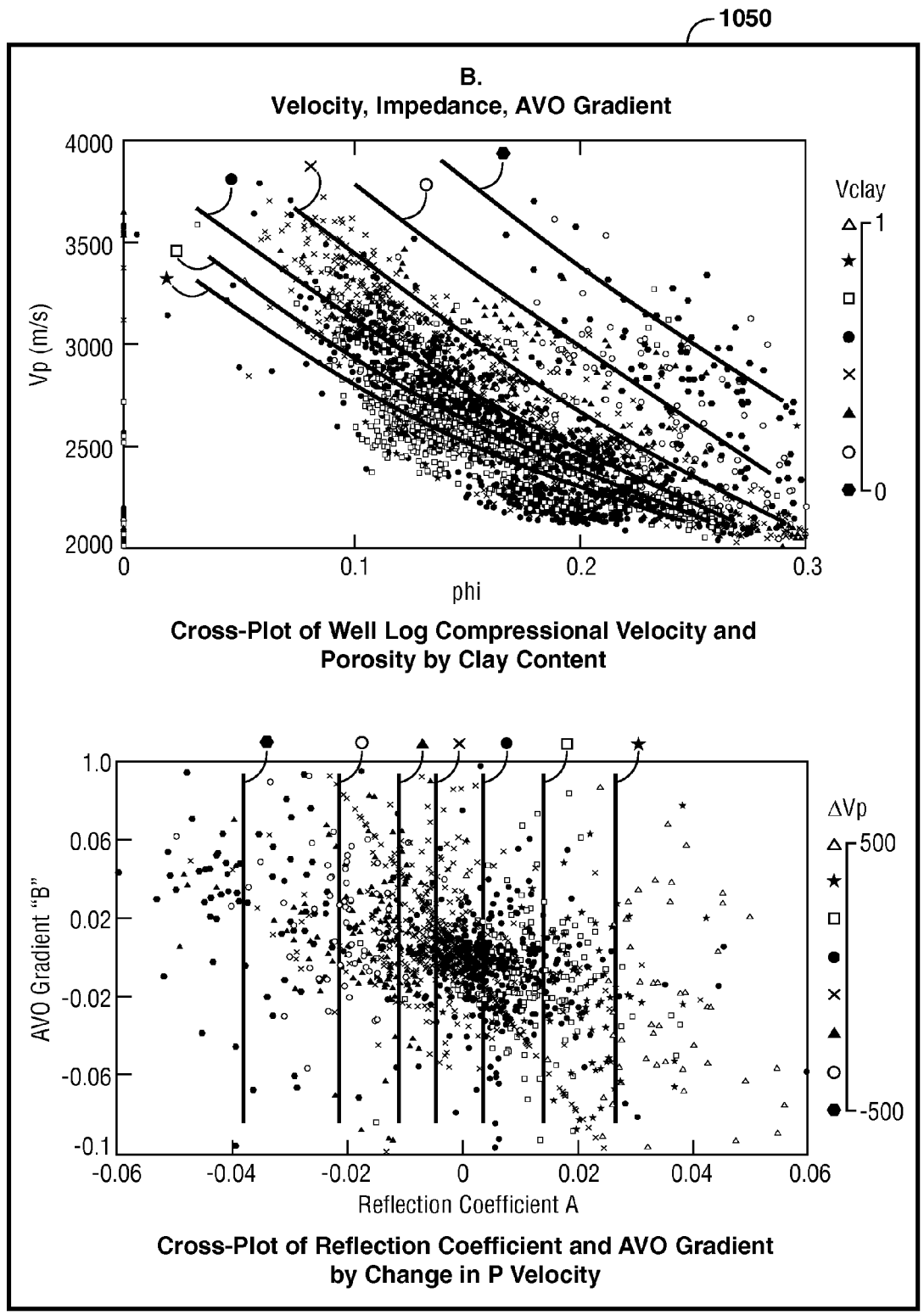
FIG. 10B2

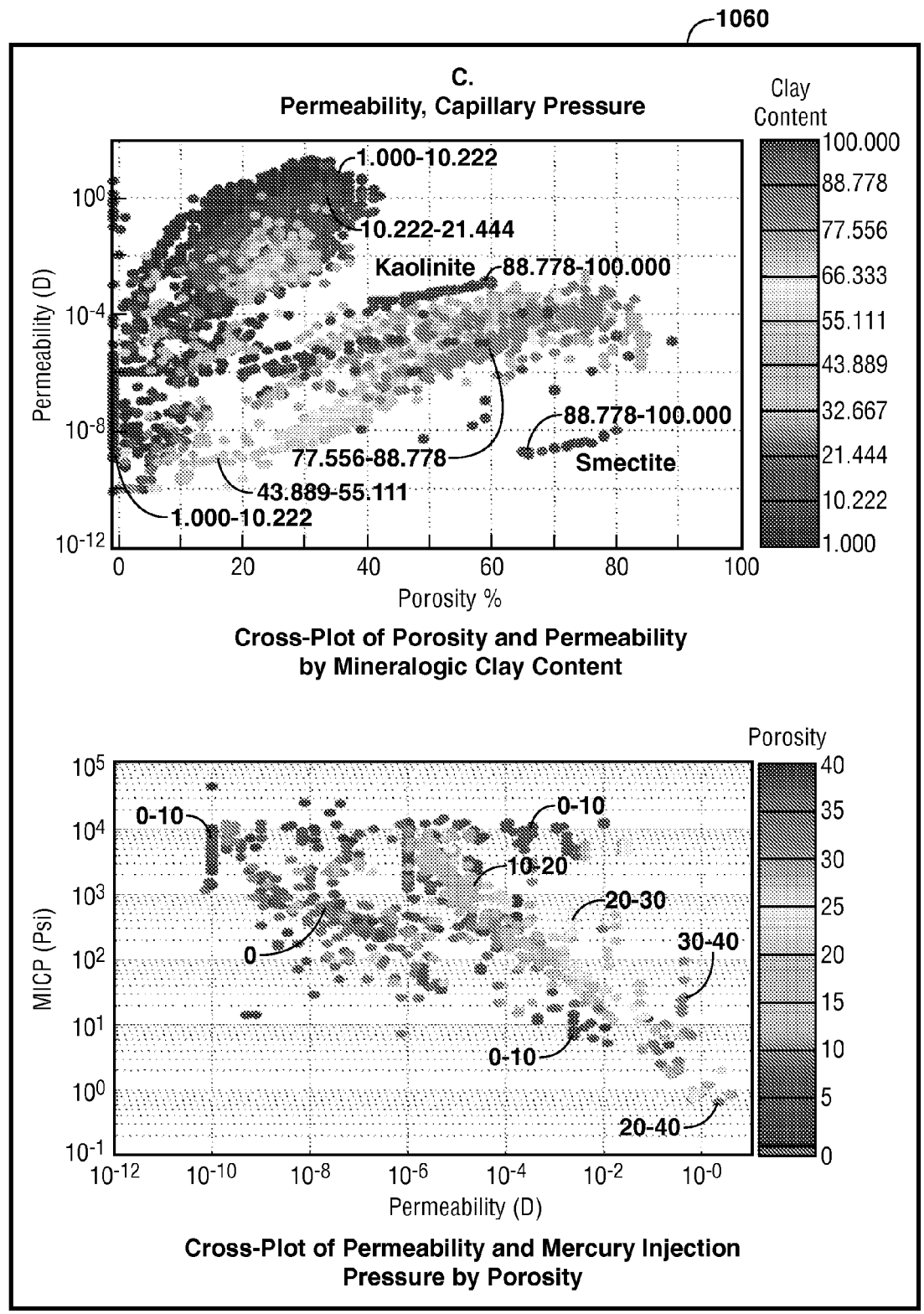
FIG. 10B3

TRANSPORT PROPERTY DATA CALCULATED FROM DERIVATIVE SEISMIC ROCK PROPERTY DATA FOR TRANSPORT MODELING

CROSS-REFERENCE TO RELATED APPLICATION

This application is the National Stage entry under 35 U.S.C. 371 of PCT/US2009/040363 that published as WO 2009/137228 and was filed on 13 Apr. 2009, which claims the benefit of U.S. Provisional Application No. 61/126,616, filed on 6 May 2008, each of which is incorporated by reference, in its entirety, for all purposes.

TECHNICAL FIELD

This description relates generally to the field of geophysical exploration and transport modeling, e.g., transport modeling for basin modeling and/or reservoir simulation. Specifically, this description relates to accurately determining transport properties from seismic data. The transport properties may be used to accurately simulate transport phenomena for a subsurface region(s).

BACKGROUND

One or more existing techniques for determining rock property data from seismic data are described in U.S. Pat. No. 6,381,543 (Guerillot et al.), U.S. Pat. No. 5,764,515 (Guerillot et al.), U.S. Pat. No. 5,638,269 (Fournier); U.S. Pat. No. 5,475,589 (Armitage), U.S. Pat. No. 5,487,001 (Neff), U.S. Pat. No. 4,926,394 (Doyea), and U.S. Pat. No. 6,374,185 (Taner et al.). The techniques described by Guerillot depend on a combination of exploration data, e.g., seismic data or an initial geologic model, in addition to production data to constrain an inversion for a geologic model that represents the physical quantity of interest. The techniques discussed by Fournier deduce geologic properties via a statistical calibration of seismic attributes and geologic parameters, and Doyea estimates lithology from seismic data with a statistical method, e.g., a Monte Carlo method. Taner discusses generating an estimate of lithological characteristics of a region of the earth's subsurface by correlating attributes of synthetic seismic data. Neff discusses determining petrophysical properties of a subterranean layer by comparing synthetic seismograms to the reflection seismic data. Armitage evaluates seismic sequence lithology and property by converting seismic velocity data to reveal the presence of seismic lithological sequences.

One or more existing techniques are also described in "Predicting VShale and Porosity Using Cascaded Seismic and Rock Physics Inversion," Saltzer et al., The Leading Edge, 24, no. 7, 732-736, (2005); "Predicting Vshale and Porosity Using Cascaded Seismic and Rock Physics Inversion," Saltzer et al., SEG, Expanded Abstracts, 24, no. 1, 1390-1392, (2005), "Using Linear Combinations of Angle Stacks to Predict Band-Limited Porosity and Vshale," Saltzer et al., SEG, Expanded Abstracts, 24, no. 1, 1303-1306, (2005); "Lithofacies Prediction in Clastic Deep Water Reservoirs," Oppert et al., SEG, Expanded Abstracts, 25, no. 1, 1708-1711, (2006); and "Sand/Shale Discrimination in Mixed-Impedance Reservoirs Using AVO Attributes," Oppert et al., SEG, Expanded Abstracts, 23, no. 1, 1495-1498, (2004).

Although results from the foregoing described techniques have been used to provide input to simulations of reservoir-scale earth models that are used to predict the flow of hydrocarbon fluids, each of these aforementioned techniques generally do not implement seismically derived rock property data and discrete mathematical models to calculate relevant transport property data, e.g., thermal conductivity, electrical resistivity, permeability, and/or capillary threshold pressure. In addition, although basin-scale pressure simulation results have been used for enhancing seismic processing, this technology does not use seismic transport property data to populate a transport model for pressure simulations.

SUMMARY

In one general aspect, a method for calculating at least one transport property for a subsurface region from derivative seismic data includes generating a model relating at least one derivative seismic rock property of a subsurface region to at least one transport property for the subsurface region. The transport property or transport properties is/are calculated by applying the generated model.

Implementations of this aspect may include one or more of the following features. For example, transport phenomena may be simulated with a transport model using at least one transport property calculated by applying the model. Simulating transport phenomena within the subsurface region may include one or more of the following, including, but not limited to: simulating reservoir fluid flow within the subsurface region using a permeability property of the subsurface region; simulating hydrocarbon migration within the subsurface region, wherein the transport model includes a static migration model incorporating a present-day subsurface configuration or a dynamic migration model incorporating evolution of subsurface rock and transport properties over geologic time using a capillary threshold entry pressure property of the subsurface region; simulating heat flow evolution within the subsurface region using a thermal conductivity property of the subsurface region; simulating aqueous fluid pressure evolution over time within the subsurface region using a permeability property of the subsurface region; and/or simulating electrical resistivity within the subsurface region using a resistivity property of the subsurface region.

The model relating at least one derivative seismic rock property of the subsurface region to at least one transport property for the subsurface region may be generated by transforming a rock property model of the subsurface region to a transport property model for the subsurface region. A model describing evolution of at least one transport property within the subsurface region over time may be generated, e.g., to facilitate basin modeling. The model relating at least one derivative seismic rock property of the subsurface region to at least one transport property for the subsurface region may be generated without relying upon production data to constrain an inversion, without using a direct inversion of seismic reflection data for transport properties, without using a statistical calibration to derive the relationship between lithologic or geologic parameters, and seismic attributes, without using only seismic attributes, without using synthetic seismograms to derive petrophysical properties of the seismic data, and/or without relying upon only the seismic velocity data.

The model relating at least one derivative seismic rock property of the subsurface region to at least one transport property for the subsurface region may be generated by one or of the following: using seismic transport property data to populate a transport model for pressure simulations; using rock and transport properties derived from the seismic data to assist in transport modeling; and/or using seismic rock property data incorporating seismic derivatives and low frequency models. Results from a simulated transport model may be compared to actual production data. One or more iterations between one or more of seismic interpretations, generation of rock and flow properties, and simulating transport phenomena may also be integrated into one or more of the foregoing implementations.

At least one derivative seismic rock property may include seismic Vclay data for the subsurface region and seismic porosity data for the subsurface region. Generating the model relating at least one derivative seismic rock property of the subsurface region to the at least one transport property for the subsurface region may include combining the seismic Vclay data and the seismic porosity data into a lithofacies property for the subsurface region. The lithofacies property may be converted into a transport property model for permeability and effective or total porosity for the subsurface region. The seismic Vclay data and the seismic porosity data may be combined into the lithofacies property for the subsurface region by cross-plotting seismic porosity and Vclay for the subsurface region. The total porosity and Vclay may be used to locally discriminate between a plurality of potential lithofacies associations for the subsurface region. The lithofacies property may be converted into the transport property by using empirical relationships to calculate flow properties for each lithofacies association. The empirical relationships may be derived from measured well data and/or from predetermined theoretical derivations. Transport phenomena may be simulated with a transport model using at least one generated transport property, wherein reservoir fluid flow is simulated within the subsurface region using the permeability property of the subsurface region. Results from the simulated transport model may be compared to actual production data. The results may be iterated between one or more of seismic interpretations, generation of rock and flow properties, and simulating transport phenomena.

A permeability property for the subsurface region may be calculated directly from the Vclay and porosity data. The permeability property may be converted into a transport property model for capillary threshold entry pressure (MICP) for the subsurface region. Transport phenomena may be simulated with the capillary threshold entry pressure (MICP) for the subsurface region, including simulating hydrocarbon migration within the subsurface region with a migration simulator. The transport model may include a static migration model or a dynamic migration model using a capillary threshold entry pressure property of the subsurface region.

At least one derivative seismic rock property may include seismic Vclay data for the subsurface region. A grain size distribution property may be determined for the seismic Vclay data, wherein silt and sand distribution is associated with each clay percentage within the seismic Vclay data. Compaction history may be determined by defining a relationship between effective stress and porosity. The compaction history and the grain size distribution property may be converted into a transport property model for capillary threshold entry pressure (MICP) over time and/or thermal conductivity over time for the subsurface region.

At least one derivative seismic rock property may include a seismic Vclay property for the subsurface region and a seismic lithofacies property for the subsurface region. The model relating at least one derivative seismic rock property of the subsurface region to the at least one transport property for the subsurface region may be generated by determining a grain size distribution definition for each lithofacies from a combination of the seismic Vclay property and the seismic lithofacies property. Compaction history may be determined by defining a relationship between effective stress and porosity. The compaction history and the grain size distribution property may be converted into a transport property model for permeability over time for the subsurface region. The fluid type across the subsurface region may be determined based upon a seismic fluid prediction determined from an AVO analysis or based on a migration simulation result. A calculated resistivity property for the subsurface region may be determined based upon the seismic Vclay property, the seismic porosity property, and the determined fluid type. Resistive, subsurface hydrocarbon accumulations may be confirmed by comparing the calculated resistivity property for the subsurface region to empirical resistivity data representative of, or acquired from, the subsurface region.

In another general aspect, a method for determining at least one transport property for a subsurface region from derivative seismic data includes generating a model relating at least one derivative seismic rock property of a subsurface region to at least one transport property for the subsurface region. A model describing evolution of the at least one transport property within the subsurface region over time is generated. The at least one transport property is calculated by applying the generated model relating at least one derivative seismic rock property to the at least one transport property. Transport phenomena are simulated with a transport model using at least one transport property calculated by applying the model. The simulation of transport phenomena may include simulating evolution of the transport phenomena over geologic time.

Depending upon the type of transport properties that are calculated for input into one or more transport models, there will be numerous applications within and outside of the petroleum industry. For example, the modeling of reservoir fluid flow may be used to predict and/or monitor hydrocarbon production within a subsurface region. The modeling of heat flow may be used to predict source rock, maturation timing, and/or reservoir quality within a subsurface region. Hydrocarbon migration modeling may be used to identify commercial hydrocarbon traps. Fluid pressure modeling may be used to predict reservoir quality, trap integrity, and/or assist drill well planning Electrical resistivity modeling may be used to identify commercial hydrocarbon traps.

In another general aspect, a tangible computer-readable storage medium includes embodied thereon a computer program configured to, when executed by a processor, calculate at least one transport property for a subsurface region based on derivative seismic data. The computer-readable storage medium includes one or more code segments configured to generate a model relating at least one derivative seismic rock property of the subsurface region to at least one transport property for the subsurface region; and calculate the at least one transport property by applying the generated model.

Implementations of this aspect may include one or more of the following features. For example, the tangible computer-readable storage medium may include one or more code segments configured to simulate transport phenomena with a transport model using at least one transport property calculated by applying the model. The tangible computer-readable storage medium may include one or more code segments configured to generate a model describing evolution of at least one transport property within the subsurface region over time. The code segments may be configured to simulate transport phenomena simulate evolution of the transport phenomena over geologic time.

In another general aspect, a method for producing hydrocarbons from a subsurface region includes determining at least one transport property for the subsurface region from derivative seismic data, wherein determining at least one transport property includes generating a model relating at least one derivative seismic rock property of a subsurface region to at least one transport property for the subsurface region. At least one transport property is calculated by applying the generated model. Transport phenomena are simulated with a transport model using at least one transport property generated by applying the model. The production of a hydrocarbon bearing reservoir is controlled based on the simulated transport phenomena. Hydrocarbons are produced from the hydrocarbon bearing reservoir.

BRIEF DESCRIPTION OF THE DRAWINGS

FIGS. 10B1, 10B2, and 10B3 are graphical views of exemplary cross-plots for rock property, acoustic property, and flow property models.

DETAILED DESCRIPTION

Figure 1:
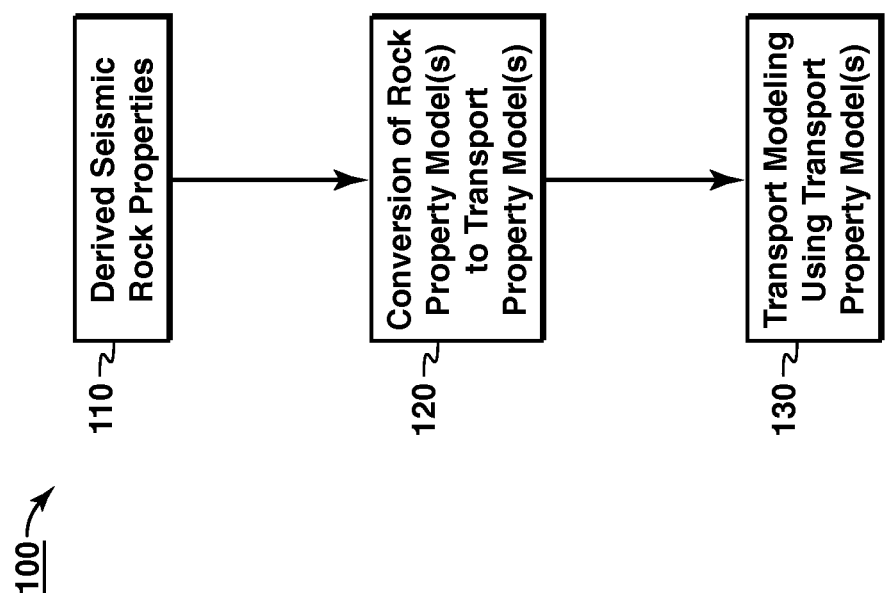
FIG. 1 is a flowchart of an exemplary process for modeling transport phenomena using a transport property model(s) derived from a derivative seismic rock property model(s).
Figure 2:
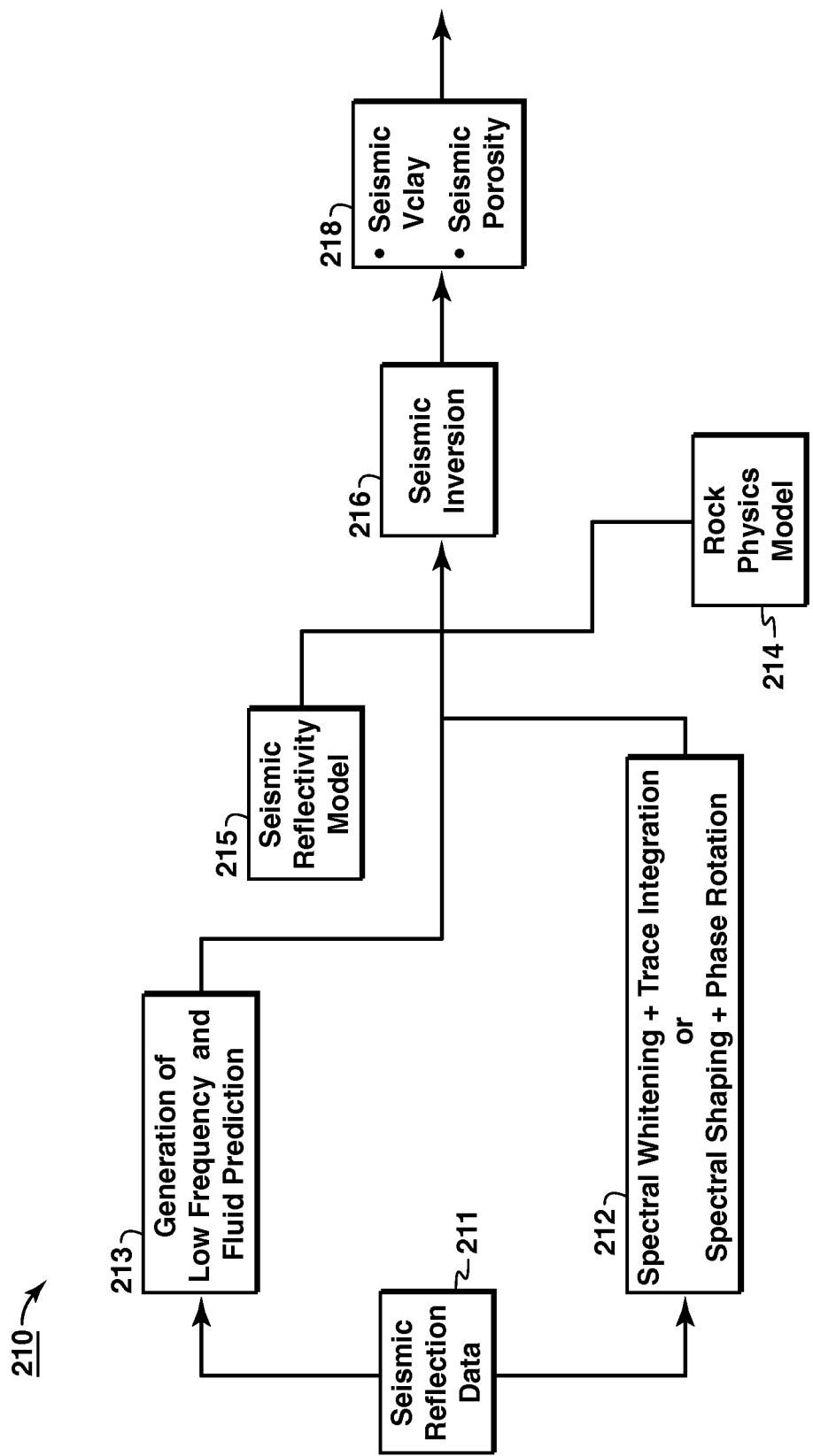
FIG. 2 is a flowchart of an exemplary process utilizing seismic inversion techniques to determine a derivative seismic rock property model(s).
Figure 3:
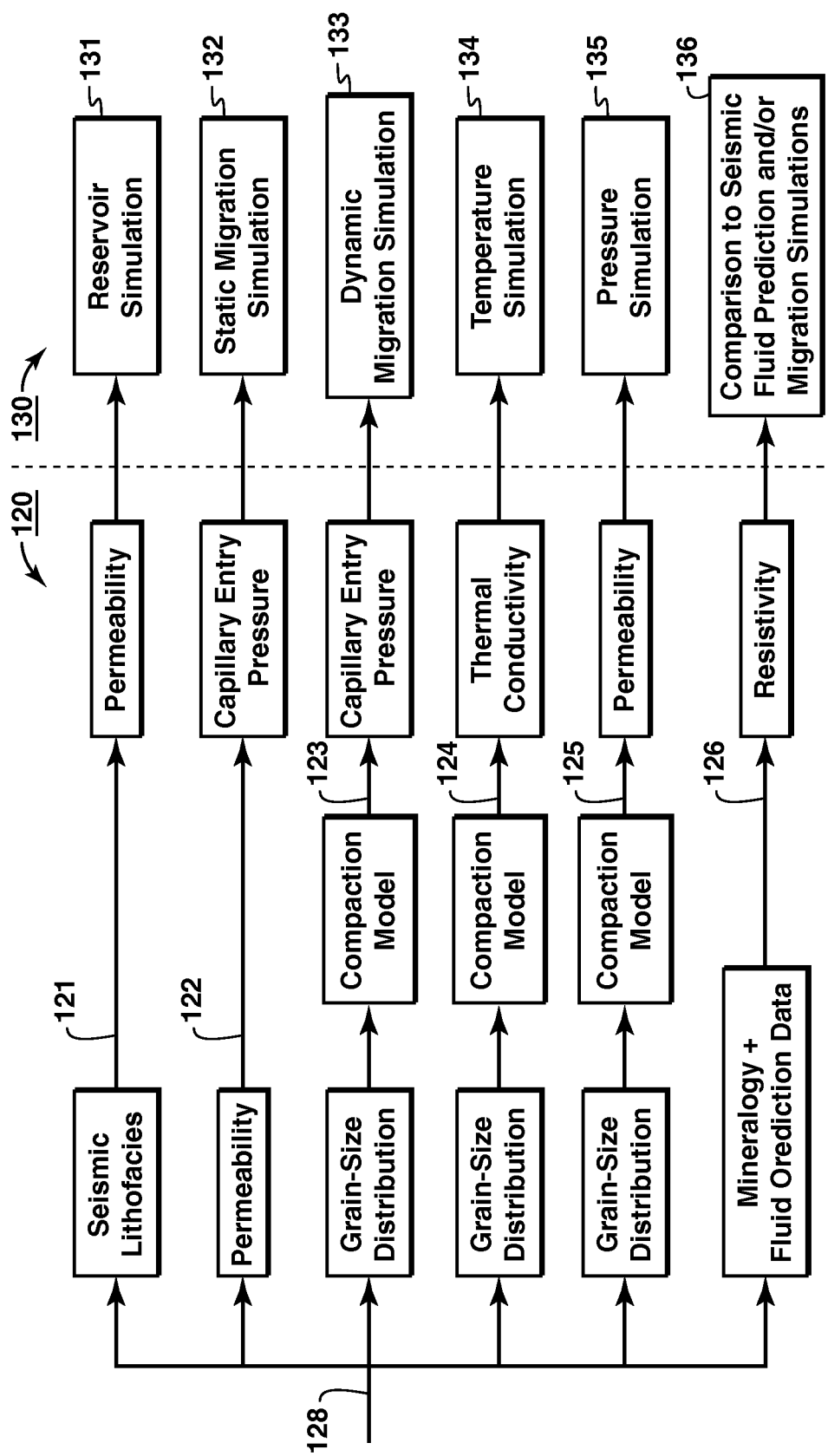
FIG. 3 is a flowchart of exemplary processes for determining a transport property model(s) from a rock property model(s) and for simulating transport phenomena with the transport property model(s) input into a transport modeling simulation.

Referring to FIGS. 1-3, the building of earth models of transport properties for the purpose of transport modeling has many applications. For example, the modeling of heat transport phenomena of basin-scale earth models allows the understanding of maturation timing of hydrocarbon source rocks and an understanding of hydrocarbon reservoir quality. Models of single-phase fluid flow and pressuring of basin-scale earth models also permits interpretation of hydrocarbon source rock maturation timing and hydrocarbon reservoir quality. Furthermore, it allows evaluation of trap integrity and assists the planning of drill wells in anticipated overpressured regions. Modeling multiphase fluid flow allows the understanding of hydrocarbon migration and trap fill, spill and leakage, which ultimately allows us to identify traps that may contain commercial quantities of hydrocarbons. Modeling the electrical resistivity of hydrocarbon simulation results may further assist in ground-truthing resistivity anomalies identified by electromagnetic data, which may be linked to hydrocarbon accumulations.

FIG. 1 is a flowchart of an exemplary process 100 for modeling transport phenomena using a transport property model(s) derived from a derivative seismic rock property model(s). In step 110, one or more rock properties are obtained from derivative seismic data. For example, derivative seismic data refers to the specific data in which seismic reflectivity data has been converted to rock properties, e.g., mineralogical clay content, porosity and fluid type. The derivative seismic data may include single or multi-dimensional representations of rock properties, e.g., one dimensional, two-dimensional, and/or three-dimensional representations of a rock properties, such as a three-dimensional volume. For example, an exemplary flow simulation may requires some volume representation of permeability and porosity for the reservoir. Standard routines exist to predict porosity from seismic data, but there is not a standard routine to extract permeability using seismic data. One or more of the foregoing embodiments describe techniques for determining both rock and transport properties from seismic data, using seismic inversion techniques and reservoir measurements of rock and transport properties for various lithofacies derived from core, log, and/or rock physics models and relationships.

In step 120 the rock property models are converted to transport property models. The transport property models are applied to create one or more transport properties. In step 130, the transport properties are used as inputs when modeling transport phenomena with a variety of transport models. Transport phenomena generally refer to various mechanisms by which particles or quantities move from one place to another. The laws which govern transport connect flux with a "motive force." Transport phenomena may include the processes of diffusion, convection, and/or radiation, and typically fall into one of three main categories. Specifically transport phenomena may include 1) heat transfer; 2) mass transfer; and 3) momentum transfer, e.g., fluid dynamics, but may also be extended to include describing the propagation of acoustic and/or electrical energy.

FIG. 2 is a flowchart of an exemplary process 210 utilizing seismic inversion techniques to determine a derivative seismic rock property model(s). In step 211, seismic reflection data is obtained for a subsurface region. The seismic reflection data is transformed to spectrally whitened, integrated trace data or spectrally shaped, quadrature data in step 212. A low frequency model that represents the frequencies below the seismic bandwidth and a fluid model indicating specific fluid types or quality is generated and input to the process in step 213. The low frequency model and the fluid model may be generated from the derivatives of the original seismic data in step 211, the spectrally modified data in step 212, or seismic interpretations including the detail required by either the fluid or low frequency model. A seismic rock physics model for each fluid present and seismic reflectivity model are established and used in steps 214 and 215, respectively. The seismic inversion (step 216) incorporates all of the input data from steps 212, 213, 214, and 215, to generate the rock properties of interest, e.g. Seismic Vclay and Seismic Porosity (step 218).

Process 210 converts seismic reflectivity data to rock property data and generally involves utilizing either a seismic reflectivity and rock physics inversion or a simple weighted-stack in order to relate elastic parameters to the rock properties of interest for each fluid type present. See, for example, the aforementioned techniques described by Oppert and Lazaratos, (2004), Saltzer et al. (2005), Saltzer and Finn, (2005), and Saltzer and Finn, (2005). The resultant derivative seismic data is then combined with a low frequency model to account for the frequencies below the bandwidth of the seismic data, subsequently producing the seismic rock property data. Modification of the seismic rock property data may be later carried out to better represent high frequency deposits that are not well imaged by the seismic data. Although process 100 involves an input of rock property data, process 100 does not specifically utilize a seismic inversion or other method for the creation of seismic rock property data.

Referring to FIG. 1, the present inventors have determined that one particular advantage of process 100 is that a variety of transport models may be applied to simulate transport phenomena, where the transport property data is created from the seismic rock property data. As referred to hereinafter, a transport model may include a computer-implemented model used to solve a set of conservation equations governing the transport phenomena under question. Parameters used for the solution to the governing equations are derived from a description of the physical properties within which the transport is occurring. For example, when considering mass transfer via molecular diffusion (Fick's Law), or heat transfer via thermal diffusion (Fourier's Law):

$$\frac{dc}{dt} = D\nabla^2 c \qquad \text{(Fick's Law) Equation 1}$$

$$\frac{dT}{dt} = \kappa\nabla^2 T \qquad \text{(Fourier's Law) Equation 2}$$

Equations 1 and 2 are the appropriate governing equations, respectively. The physical properties of the medium are utilized for the determination of the molecular diffusion coefficient (D) and the thermal conductivity (K). In the foregoing embodiments, the physical properties used in the solution of the governing equations are derived from an earth model.

An earth model includes an appropriate three-dimensional representation of the subsurface geology. Specifically, the earth model includes a structural framework incorporating the distribution of major interpreted stratigraphic units and includes the effects of faulting, folding, and erosion. The major stratigraphic divisions are subdivided into layers of cells with differing geometries defined by their relationship to the bounding isochronous surfaces. The earth model also includes rock type, e.g., a description of the lithology associated with each cell in the model. The earth model also includes transport properties, e.g., thermal conductivity, hydraulic conductivity, or electrical conductivity. The magnitude and distribution of these transport properties have a large impact on the solution to equations governing the transport phenomena. The earth model may be generated at any appropriate scale or resolution. In general, a basin model includes a scale of hundreds of kilometers in length and tens of kilometers in depth. A reservoir-scale may be limited to hundreds of meters in length, and tens of meters in depth. The resolution of the earth model is inferred by the discrete cell size assigned to spatially represent the subsurface feature, and can vary from a cell size of tens of kilometers to mere meters.

Exemplary transport models typically used within the foregoing embodiments include basin models and reservoir models. A basin model is a computer-implemented model used to simulate the evolution of pressure and temperature during the formation and evolution of a sedimentary basin. This model may or may not simultaneously solve for the transport of hydrocarbons within the subsurface. One of the features of these models is that the solution of the transport equations is fully coupled to compaction due to burial or denudation resulting from geologic processes. A reservoir model is a computer-implemented model used to simulate the flow of fluids, e.g., typically oil, water, and gas, through a porous media.

FIG. 3 is a flowchart of exemplary processes for determining a transport property model(s) from a rock property model(s) and for simulating transport phenomena with the transport property model(s) input into a transport modeling simulation. In FIG. 3, step 120 (anything left of the vertical dotted line shown in FIG. 3), six exemplary transport property models are generated from derivative seismic data. In addition, one or more transport properties are calculated 121-126 by applying the respective transport property model. The input to each of these steps may be the derivative seismic data, e.g., seismic Vclay and seismic porosity 218, from process 210 (FIG. 2). The transport properties determined from steps 121-126 are then used to simulate various transport phenomena in steps 131-136. For example, step 121 involves the conversion of seismic lithofacies data to transport property data. Lithofacies data refer to the classification of one or more seismic rock property data into meaningful categories that represent a geologic facies of interest. A geologic facies should ideally be a distinctive rock that forms under certain conditions of sedimentation, reflecting a particular process or environment. Lithofacies refer to a subdivision of stratigraphic units based on their lithological character and depositional environment or style. Lithofacies may be distinguished using core, wire line log or seismic data. Each lithofacies may span a unique range of rock and fluid flow properties (such as porosity and permeability) and, therefore, constructing a lithofacies-based earth model assists in transport modeling. The specific examples of transport phenomena shown in FIG. 3 are described in greater detail hereinafter with respect to FIGS. 4-9.

Referring to FIGS. 4-9, one or more of the exemplary workflows use different mathematical models to calculate transport properties from seismic rock property data and then pass these data to transport models for an analysis of transport phenomena. Each example shown in FIGS. 3 and 4-9, are individual examples of advantageous ways to use seismic rock property data for modeling transport phenomena. However, one of skill in the art will appreciate that there may be other specific applications of utilizing seismic rock property data to facilitate transport modeling. Furthermore, a multitude of mathematical models exist, which may be used to obtain seismic rock property data for input to transport modeling. In general, any mathematical models derived from seismic rock property data and utilized specifically for transport modeling are useful in the general process 100 described in connection with and shown in FIG. 1.

Figure 4:
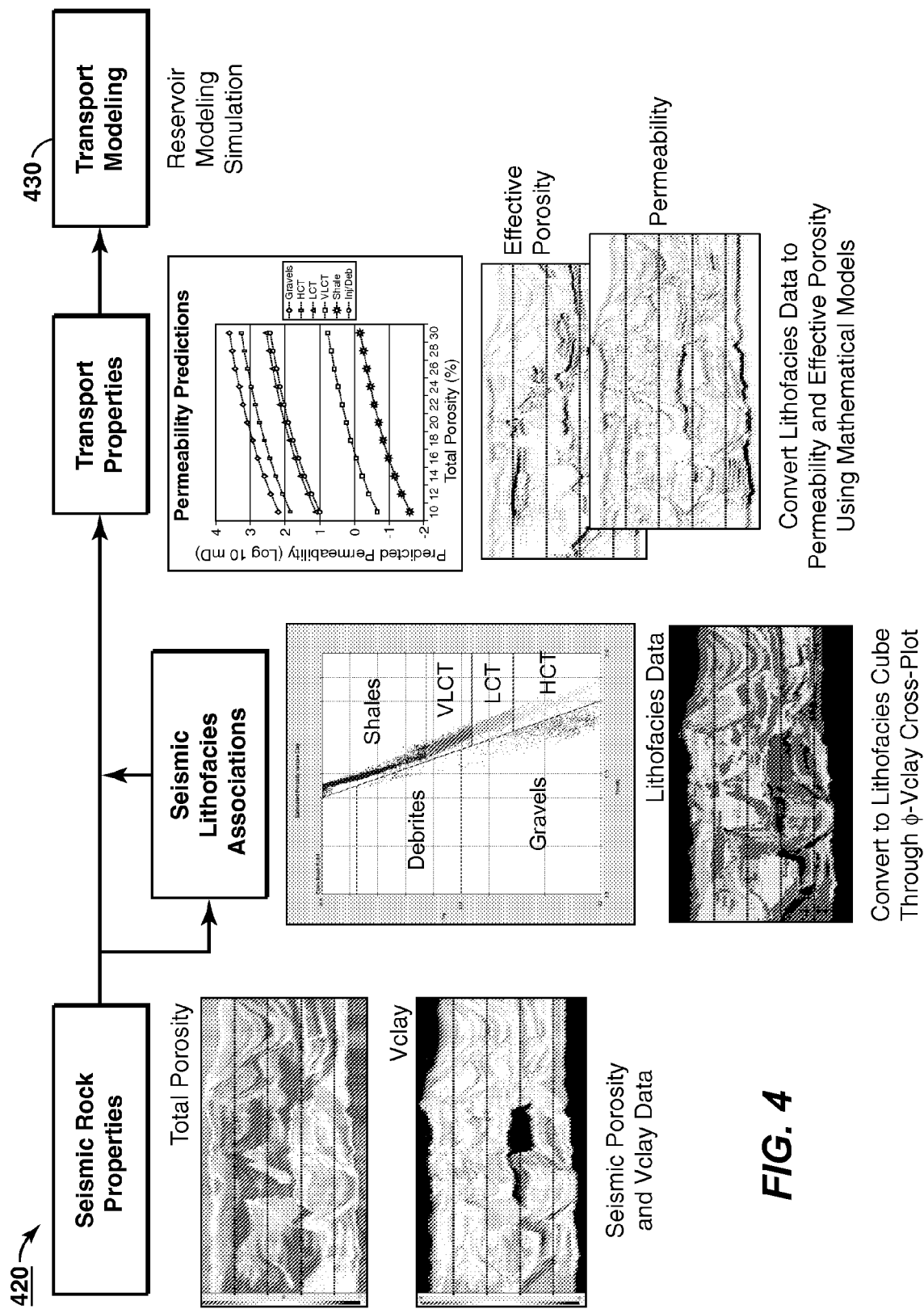
FIG. 4 is an exemplary process for determining transport properties using the seismic rock property model(s) and a transform to a seismic lithofacies property(s) for a subsurface region.

FIG. 4 is an exemplary process 420 for determining transport properties using the seismic rock property model(s) and a transform to a seismic lithofacies property(s) for a subsurface region. Referring to FIG. 4, seismic rock properties, e.g., seismic porosity and volumetric clay data are used to calculate seismic lithofacies. The seismic lithofacies associations are determined by converting the seismic rock property data to a lithofacies cube. Process 420 is particularly advantageous in clastic depositional systems, however, variations of process 420 may be used for applications in alternative depositional environments, e.g., carbonate, volcanic.

Initially, a range of seismic lithofacies associations are established from a deterministic analysis of one or more of the rock property data. In the example shown in FIG. 4, total porosity and clay volume data (Vclay) are used to distinguish six different lithofacies categories. One technique that may be used to derive lithofacies data from seismic data in deepwater clastic environment is further described by Oppert et al. (2006), mentioned hereinabove. However, any method discriminating lithofacies associations from seismic data may be used. For example, U.S. Pat. No. 6,950,786 (Sonneland et al.), describes an applicable method and apparatus for generating a cross plot in attribute space from a plurality of attribute data sets and generating a class data set from the cross plot. Sonneland et al. describe generating a class data set from a cluster of points within a cross plot of multiple attributes. In process 420, a preferred embodiment does not have to define the class data sets based on clusters within the crossplot and, the crossplots are therefore reliant upon only the amplitude attribute, e.g., not alternative attributes such as phase. Once a seismic lithofacies data set is generated, mathematical relationships are developed to calculate the transport properties for each lithofacies category. The relationships may be derived from measured well data, e.g., core or wire-line log data, or from appropriately predetermined theoretical derivations. These relationships may linearly or nonlinearly relate the transport property of interest to the seismic rock properties. In the example shown in FIG. 4, the rock properties, e.g., total porosity and Vclay, are transformed to the transport properties, permeability and effective porosity through the equations below:

Traction:

$Log(K)=3.57\phi+6.82\phi Vclay-4.11Vclay+1.6$

High concentration turbidites:

$Log(K)=8.75\phi+19.22\phi Vclay-4.51Vclay+1.42$

Low concentration turbidites:

$Log(K)=4.68\phi+15.23\phi Vclay-4.56Vclay-8.23$

Very low concentration turbidites:

$Log(K)=8.32\phi+7.45\phi Vclay-6.53Vclay-2.33$

Shale:

$Log(K)=82.14\phi-156.23\phi Vclay+6.58Vclay-7.3$ $Eff.Por.=(1-Vclay)\phi$

In step 430, the transport property data are then passed to the transport model, e.g., the reservoir simulator, to model production of hydrocarbon fluids. In FIG. 4, a reservoir simulator receives the input permeability and effective porosity transport property data. The results from the simulator are compared to actual production data to allow iteration between seismic interpretation, generation of the rock and transport properties, and/or transport modeling.

In an exemplary embodiment, the prediction of Vclay and porosity using a seismic inversion that removes fluid effects and incorporates low frequency models of porosity and Vclay. The seismic predictions of Vclay and porosity are translated to lithofacies categories based on sorting, grain size, and clay content. Reservoir measurements, e.g., from core plug data, may then be used to define linear relationships between porosity, clay content, and permeability for each lithofacies group. The lithofacies prediction, porosity prediction, and Vclay prediction are used collectively to define a permeability volume based on the aforementioned relationships. The seismic Vclay prediction may then be transformed to a net-to-gross prediction by first creating a Vshale prediction, where Vshale=Vclay+Vsilt (in fractions), and Vsilt is a derived by alternative calculation, or otherwise treated as an estimated constant. The porosity of the shales is removed from the seismic total porosity prediction to obtain an effective porosity prediction for the sands. The effective porosity and permeability prediction volumes are together ready for use in geologic modeling and flow simulation.

Figure 5:
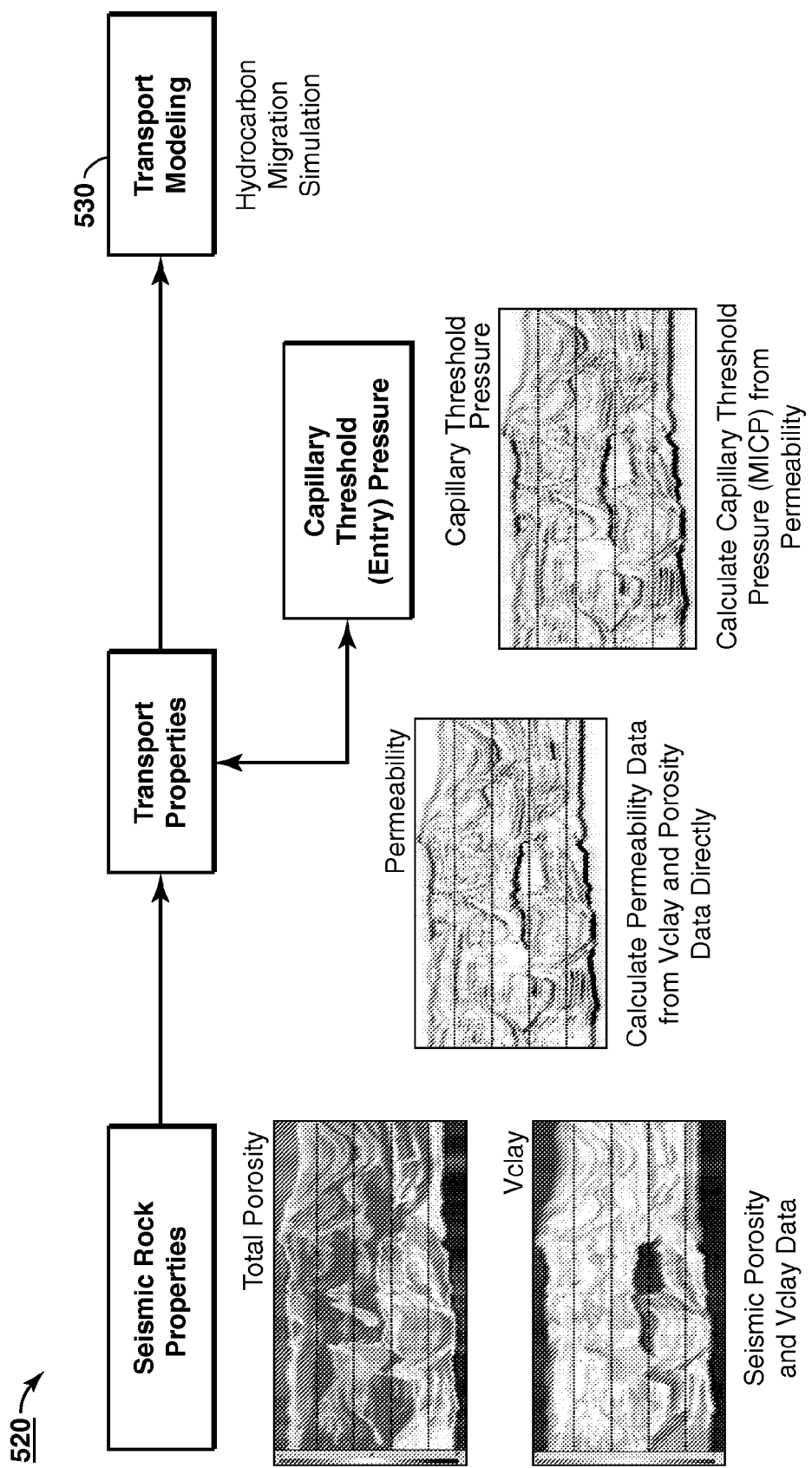
FIG. 5 is an exemplary process for determining transport properties and capillary threshold entry pressure for a subsurface region based upon seismic rock property model(s).
Figure 6:
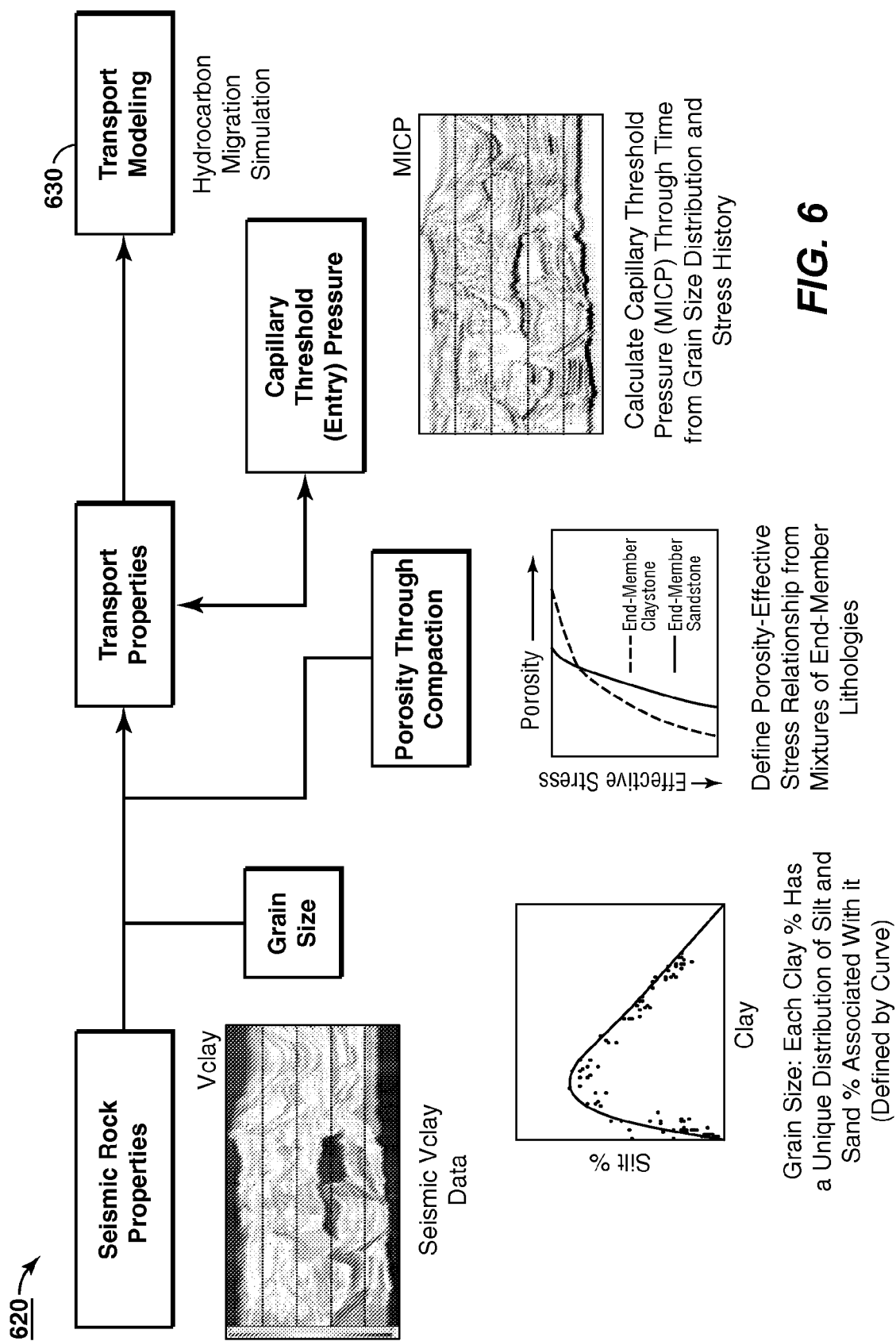
FIG. 6 is an exemplary process for determining transport properties, including, but not limited to capillary threshold pressure, through time for a subsurface region based upon seismic rock property model(s), grain size, and porosity-compaction models.

FIG. 5 is an exemplary process 520 for determining transport properties and capillary threshold entry pressure for a subsurface region based upon seismic rock property model(s). Specifically, in step 520, permeability and capillary threshold pressure are calculated for static migration modeling in step 530. FIG. 5 is representative of an exemplary process for any clastic depositional system. First, permeability is calculated from seismically-derived Vclay and porosity using the following equations:

$K=C_1(\phi-\phi_0)^{C_2}$ where the porosity $\phi$ and the percolation porosity $\phi_0$ are given as a percentage; and the constants $C_1$ and $C_2$ are given by:

$C_1=10^{4*(Clay\ Content)^{-12}}$ $C_2=2.5*(Clay\ Content)^{0.25}$ with the clay content as a percentage of the solid fraction. From the permeability, a Capillary Threshold Pressure is calculated, which controls hydrocarbon migration, fill, spill and leak using the following equation:

$$P_c = \frac{1}{K^n}$$

where the permeability K is in darcies, and the constant n has a value between approximately 0.35 to 0.65, depending on the data types used to estimate permeability and capillary threshold pressures. Although the aforementioned mathematical models are utilized in a preferred embodiment, other applicable mathematical models may be used in the application of the model to seismic rock property data for the purpose of obtaining transport property data for transport modeling. In step 530, the capillary threshold pressure data is passed to a migration simulator to model hydrocarbon migration. The results may be compared to seismic fluid prediction data to allow iteration between amplitude-variation with offset (AVO) analysis, e.g., a technique by which geophysicists determine thickness, porosity, density, velocity, lithology and fluid content of rocks, and hydrocarbon migration modeling. FIG. 6 is an exemplary process for determining transport properties, including, but not limited to, capillary threshold pressure through time for a subsurface region based upon seismic rock property model(s), grain size, and porosity-compaction models. Similarly to FIG. 5, the process shown is particularly advantageous in clastic depositional systems. In step 620, grain-size distribution, compaction behavior or history, permeability and capillary threshold pressure are calculated for dynamic migration modeling 630. Specifically, rather than a static migration model (FIG. 5), in which the present-day property distribution is used to model hydrocarbon migration, a dynamic migration model may be constructed that models hydrocarbon migration through geological time through steps 620, 630. In order to do this, clay minerals are assumed to be clay-sized particles, and silt-sized and sand-sized particles are assumed to be quartz. The grain-size data is then used to populate each seismic cell with a clay, silt and sand fraction from the Vclay data alone. The compaction models are used to relate porosity to effective stress to track the porosity through time. The results may be iterated between the present-day predicted porosity from the compaction model and the seismic inversion result of porosity to optimize the model. The dynamic evolution of porosity can be converted to a dynamic evolution of capillary threshold pressure using a variety of mathematical equations, including, but not limited to those outlined in FIG. 5 to allow dynamic migration modeling using a dynamic migration simulator.

Figure 7:
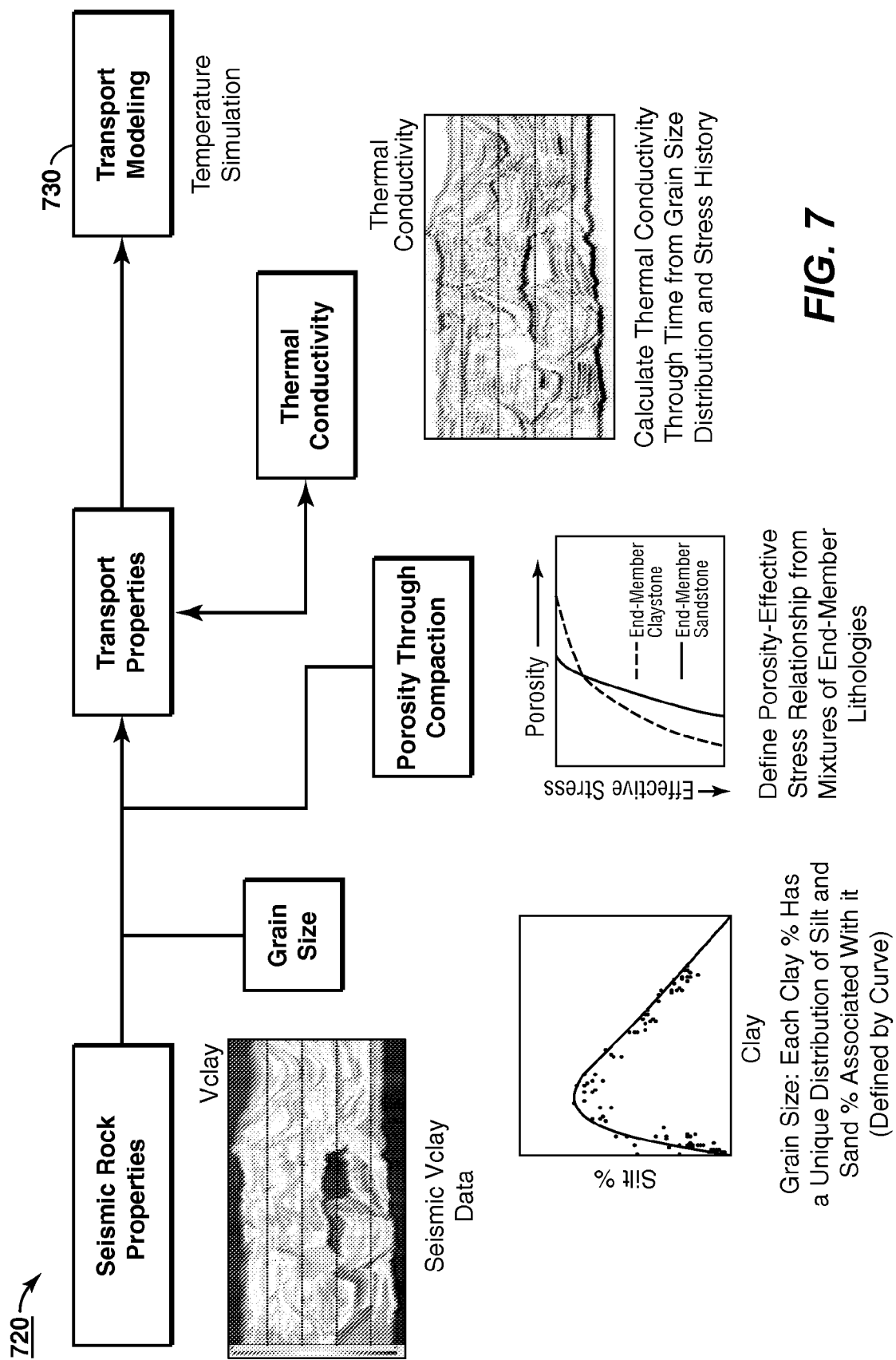
FIG. 7 is an exemplary process for determining transport properties, including, but not limited to thermal conductivity, through time for a subsurface region based upon seismic rock property model(s), grain size, and porosity-compaction models.

FIG. 7 is an exemplary process for determining transport properties, including, but not limited to thermal conductivity through time for a subsurface region based upon seismic rock property model(s), grain size, and porosity-compaction models. Referring to FIG. 7, grain-size distribution, compaction and thermal conductivity are calculated in step 720 for temperature modeling in step 730. For example, heat transport in basin modeling is simulated by solving thermal diffusion according to Fourier's Law.

$$\frac{dT}{dt} = \kappa \nabla^2 T \qquad \text{(Fourier's Law)}$$

A useful parameter relating the time rate of change of temperature to the heat flux is the thermal conductivity ($\kappa$) tensor. The thermal conductivity tensor and the manner in which it changes over time is prescribed for each computational cell in the model in order to solve Fourier's Law. The workflow that tracks the evolution of porosity of a three-component grain-size distribution through time may also be used to allow simulations of heat flow in basin temperature simulators, using a mathematical model that relates porosity and grain-size distributions to thermal conductivity.

Figure 8:
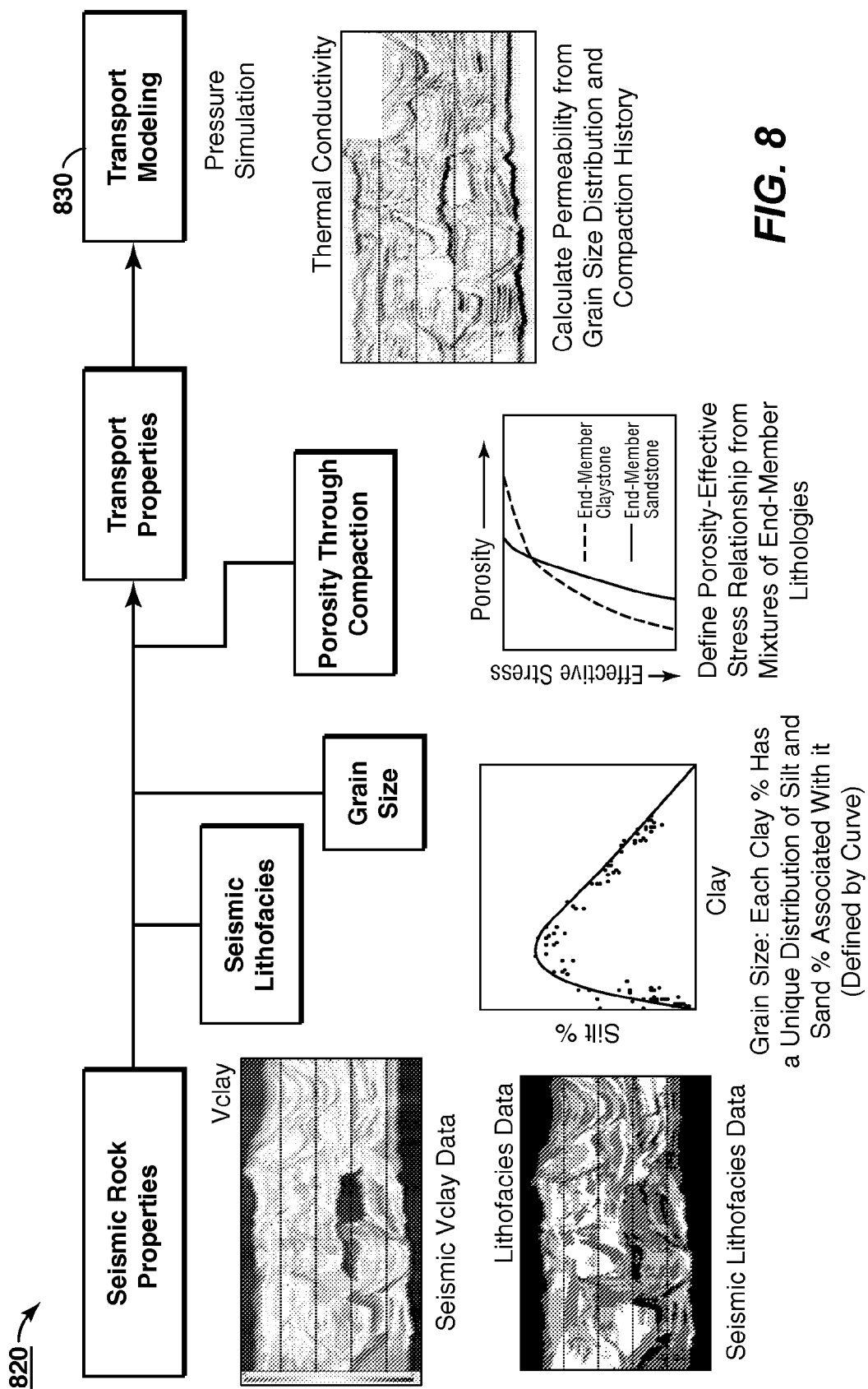
FIG. 8 is an exemplary process for determining transport properties, including, but not limited to permeability, for a subsurface region based upon seismic rock property model(s), seismic lithofacies, grain size, and porosity-compaction models.

FIG. 8 is an exemplary process for determining transport properties, including, but not limited to permeability for a subsurface region based upon seismic rock property model(s), e.g., seismic lithofacies, grain size, and porosity-compaction models in step 820, and pressure modeling is performed in step 830. The pressure modeling 830 is another application of inverted seismic data. Similarly to FIG. 6 and FIG. 7, the Vclay may be converted to grain-size distributions. However, in this example, the grain-size distributions are more complex than in the previous example and tied to deepwater lithofacies. Based on a combination of seismic facies analysis and the inverted Vclay data, a more complex grain-size distribution may be derived for the earth model. Subsequently, these grain-size distributions are again inverted into porosity evolutions over time, using a constitutive compaction model for grain-size mixtures. These are subsequently converted to permeability at an appropriate scale to run pressure simulations using a basin aqueous fluid flow simulator.

Figure 9:
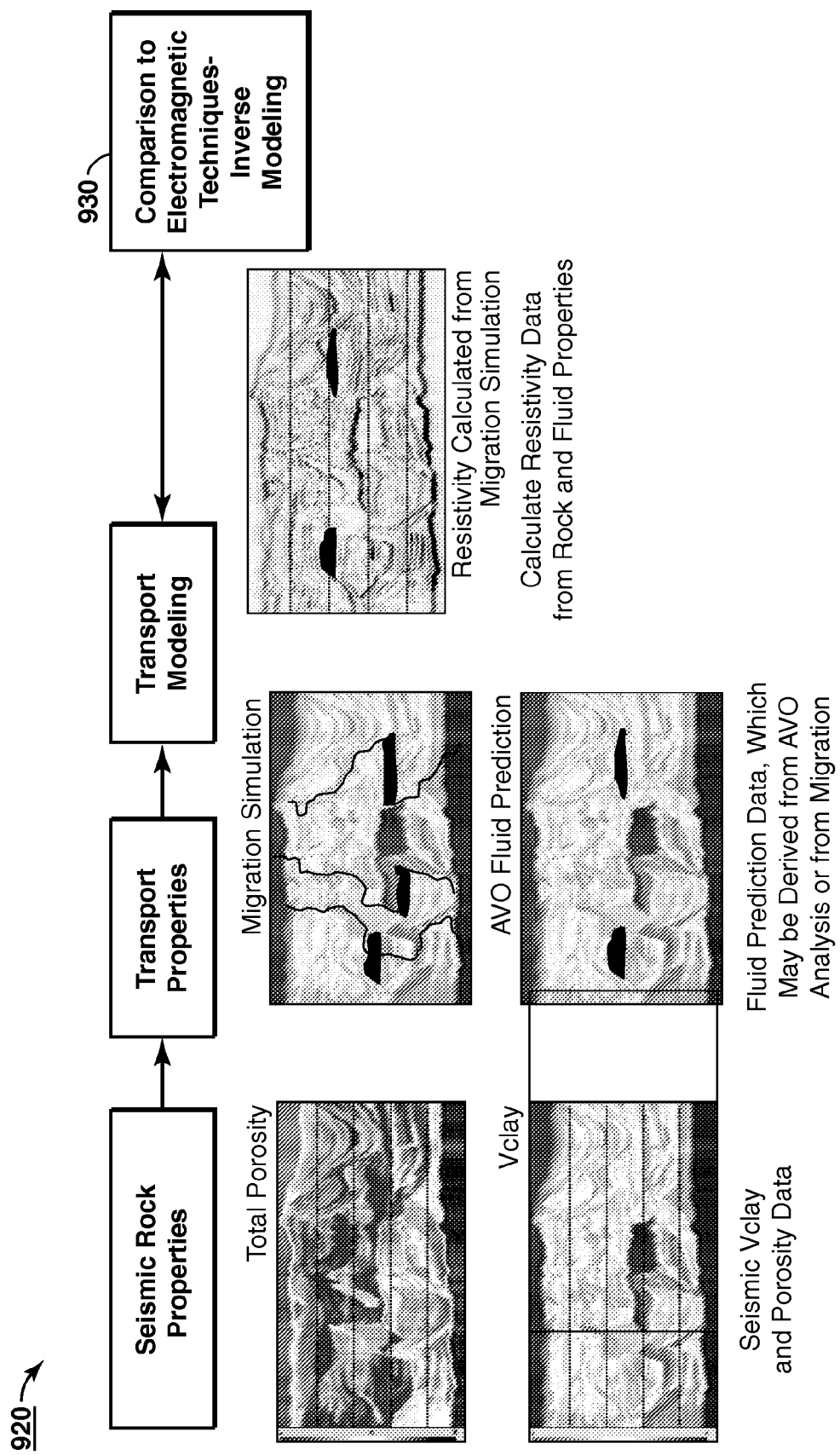
FIG. 9 is an exemplary process for determining a resistivity model for a subsurface region based upon results from transport modeling of seismic transport properties made from seismic rock property model(s).

FIG. 9 is an exemplary process for determining a resistivity model for a subsurface region based upon results from transport modeling of seismic transport properties made from seismic rock property model(s). Referring to FIG. 9, seismic Vclay, porosity and fluid prediction data are calculated in step 920 for comparison to acquired resistivity models to calculate electrical resistivity in step 930. Calculating the resistivity utilizes the knowledge of mineral constituents, which is derived from the seismically inverted Vclay, which is related to grain-size and mineralogy, porosity (which comes from the seismically inverted porosity) and fluid type. Fluid type may come either from a seismic fluid prediction, determined from AVO analysis or may come from migration simulation results. The calculated resistivity data may be compared to acquired resistivity data to allow identification of valid subsurface (resistive) hydrocarbon accumulations. Optimization may be integrated into the process of FIG. 9, e.g., by optimizing either the AVO analysis or the migration modeling.

Figure 10A:
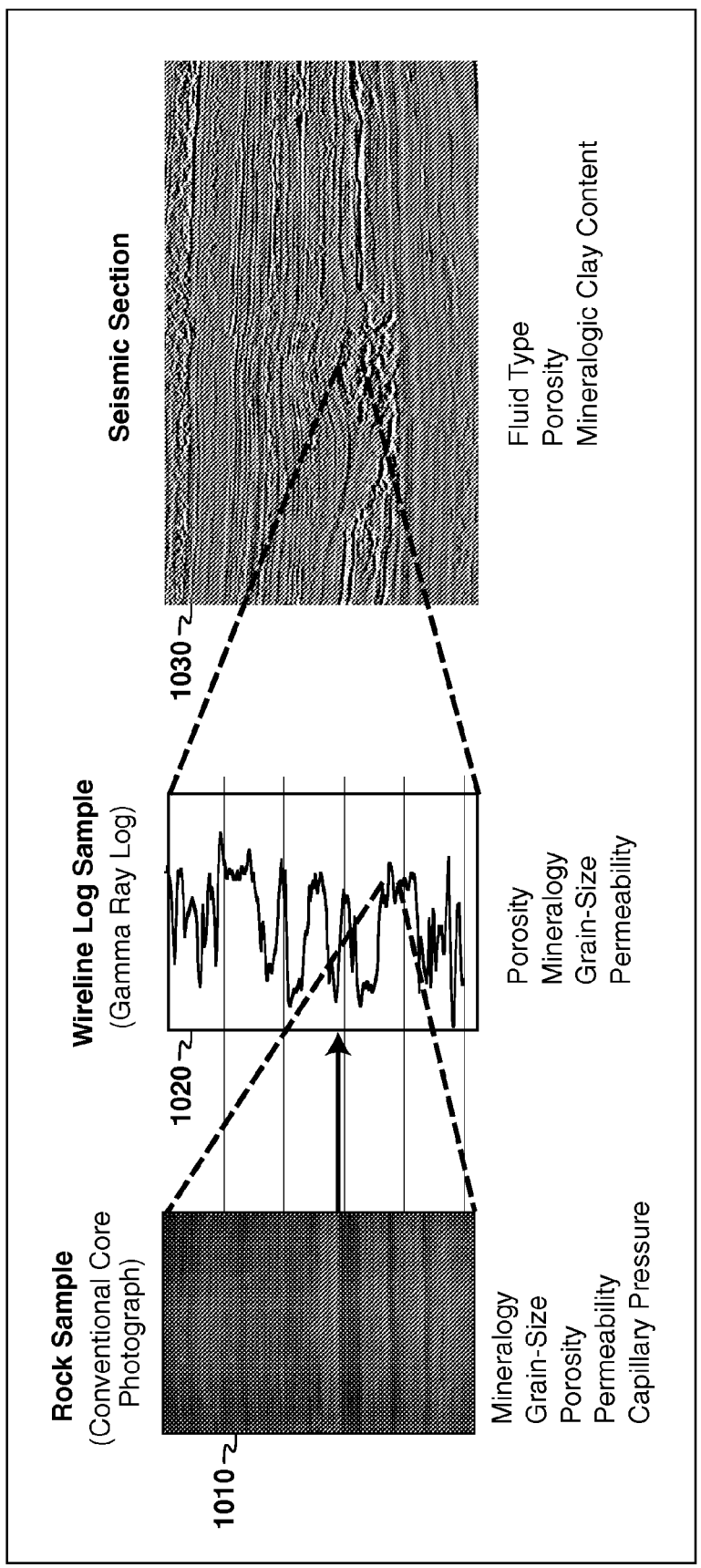
FIG. 10A is a flowchart of an exemplary process for upscaling rock properties relevant for basin thermal, pressure, or migration models.
Figure 10C:
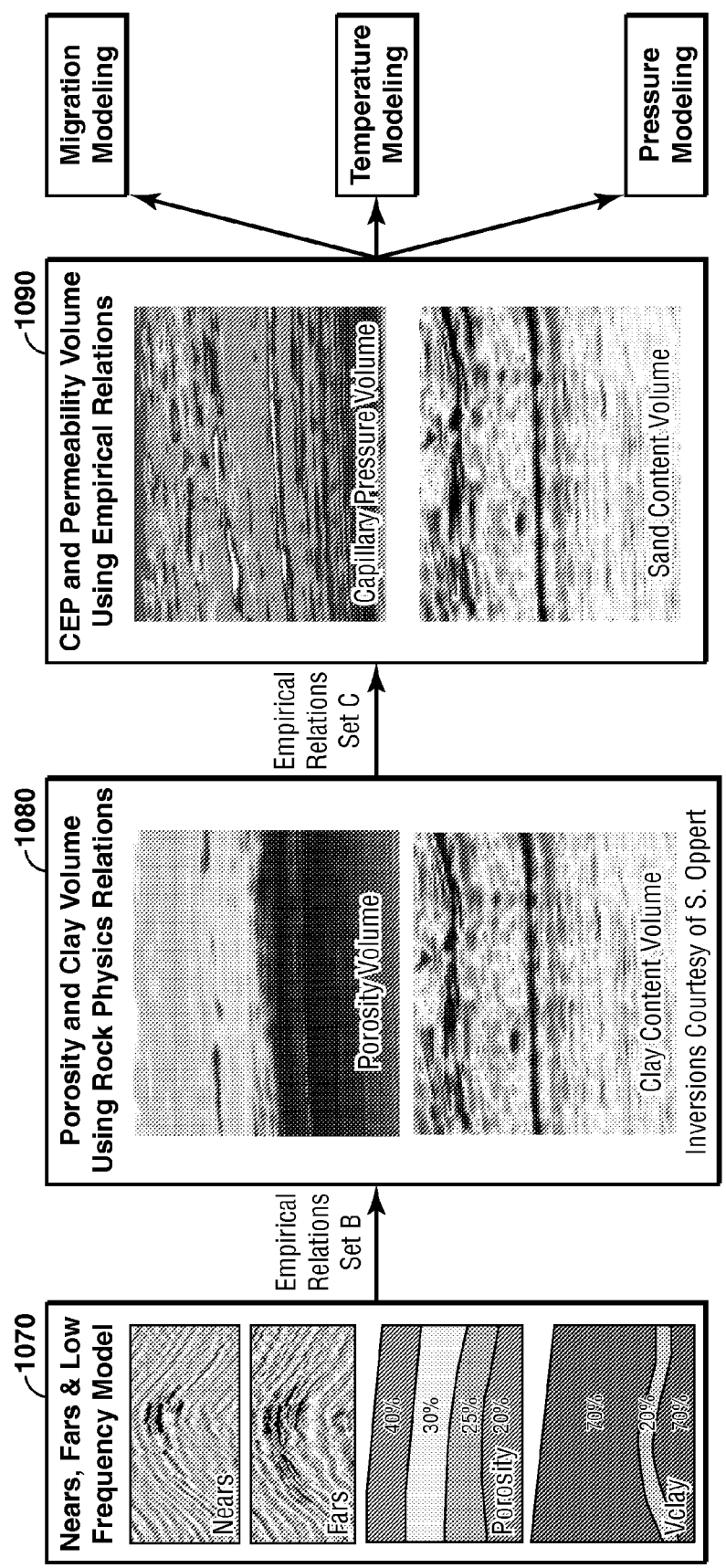
FIG. 10C is a flowchart of an exemplary process for incorporating flow volumes in basin thermal, pressure, or migration models.

Referring to FIGS. 10A-C, the inversion of seismic data enables the generation of rock property volumes, such as clay content and porosity. The relationship between exemplary rock properties, fluid flow properties, and seismic properties of clastic sedimentary rock shown in FIGS. 10A-C demonstrate how seismic inversion techniques can be utilized in basin modeling applications. FIG. 10A is a flowchart of an exemplary process for upscaling rock properties relevant for basin thermal, pressure, or migration models. One or more rock properties may be upscaled from a rock sample 1010, e.g., a 10 cm resolution, to a well log sample 1020 (dm resolution) and ultimately to a seismic sample 1030 (m to tens of meters resolution). The properties (and their respective relative confidence of the measure) that may be directly measured or implied from the data are shown for each scale in FIG. 10A, e.g., with mineralogy (high), grain-size (high), porosity (high), permeability (intermediate), and capillary pressure (low) measured from the rock sample 1010. The wireline log sample 1020 permits the measure of porosity (high), mineralogy (intermediate), grain-size (intermediate), and permeability (low). The seismic section 1030 permits the measure of fluid type (intermediate), porosity (intermediate), and mineralogic clay content (low).

FIG. 10B is a graphical view of exemplary cross-plots for rock property, acoustic property, and flow property models. Exemplary empirical and theoretical relationships that bridge rock, seismic, and fluid flow properties allow inversion of seismic data to properties relevant to basin modeling are shown in FIGS. 10B1, 10B2, and 10B3. Specifically, rock properties clay content and porosity 1040 (FIG. 10B1) relate to acoustic velocities, impedance, and AVO 1050 (FIG. 10B2). Permeability and capillary pressure cross plots, e.g., fluid properties 1060 (FIG. 10B3), are also shown. FIG. 10C is a flowchart of an exemplary process for incorporating flow volumes in basin thermal, pressure, or migration models. Referring to FIG. 10C, three-dimensional seismic data aids in basin-scale migration, thermal, and/or pressure modeling. Specifically, rock property prediction methods that are suited for different data density and quality may be incorporated into the above-described techniques. FIG. 10C graphically depicts using nears, fars, and low frequency models 1070 to generate porosity and clay volumes 1080 using rock physics relationships. The porosity and clay volumes 1080, e.g., calibrated to well log data and sample measurements, are used to generate seismically-derived basin-scale volumes of flow properties 1090, e.g., permeability and capillary entry pressure.

A number of embodiments have been described. Nevertheless, it will be understood that various modifications may be made without departing from the spirit and scope of the invention. Although the foregoing implementations have described the application of the transport property models and associated data to various, exemplary transport models, additional transport property models (for various transport models) may be generated using derivative seismic rock property models. For example, inverted or derivative seismic data may be used for various transport modeling applications. Depending upon the type of transport property data that is generated as an input into one or more transport models, there will be numerous applications within and outside of the petroleum industry. For example, the modeling of reservoir fluid flow may be used to predict and/or monitor hydrocarbon production within a subsurface region. The modeling of heat flow may be used to predict source rock, maturation timing, and/or reservoir quality within a subsurface region. Hydrocarbon migration modeling may be used to identify commercial hydrocarbon traps. Fluid pressure modeling may be used to predict reservoir quality, trap integrity, and/or assist drill well planning Electrical resistivity modeling may be used to identify commercial hydrocarbon traps.

One or more of the aforementioned processes and/or techniques to generate transport properties from seismic rock properties, can be implemented in digital electronic circuitry, or in computer hardware, firmware, software, or in any combination thereof. Any of the aforementioned functionality may be implemented as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

One or more process steps of the invention can be performed by one or more programmable processors executing a computer program to perform functions of the invention by operating on input data and generating output. One or more steps can also be performed by, and an apparatus or system can be implemented as, special purpose logic circuitry, e.g., an FPGA (field programmable gate array) or an ASIC (application-specific integrated circuit). In addition, data acquisition and display may be implemented through a dedicated data collection and/or processing system, e.g., containing data acquisition hardware, such as hydrophones and/or geophones, a processor(s), and various user and data input and output interfaces, such as a display component for graphically displaying one or more of the simulations and/or calculated transport properties obtained through any of the aforementioned process steps or processes.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM (compact disk read-only memory) and DVD-ROM (digital versatile disk read-only memory) disks. The processor and the memory can be supplemented by, or incorporated in special purpose logic circuitry.

All such modifications and variations are intended to be within the scope of the present invention, as defined in the appended claims. Persons skilled in the art will also readily recognize that in preferred embodiments, at least some of the method steps method are performed on a computer, e.g., the method may be computer implemented. In such cases, the resulting model parameters may either be downloaded or saved to computer memory.

We claim:

1. A method for calculating a transport property for rock in a subsurface region from derivative seismic data, the method comprising:
    determining models of porosity and clay volume fraction $V_{CLAY}$ from seismic reflection data;
    determining a plurality of different lithofacies categories associated with the porosity and $V_{CLAY}$ models, such that a model of the rock is subdivided according to lithofacies category;
    for each lithofacies category, generating a mathematical relationship to calculate a transport property from the porosity and clay volume fraction $V_{CLAY}$ models; and
    calculating, using a programmed computer processor, the transport property by applying the mathematical relationship.

2. The method of claim 1, wherein the transport property is permeability or effective porosity.

3. The method of claim 1, wherein the lithofacies category associations are determined by converting the porosity and $V_{CLAY}$ models to a lithofacies cube using a cross-plot of porosity versus $V_{CLAY}$.

4. The method of claim 1, wherein each mathematical relationship is derived from measured well data, or from theoretical derivations.

5. A method for calculating a transport property through time for a subsurface region from derivative seismic data, the method comprising:
    determining a model of clay volume fraction $V_{CLAY}$ from seismic reflection data;
    converting the $V_{CLAY}$ model to a grain-size distribution, and associating clay, silt, and sand each with a different grain size;
    determining a compaction model using the grain-size distribution;
    using the compaction model to relate porosity to effective stress through time, and from that determining porosity through time using a stress history of the subsurface region;
    generating a mathematical relationship relating porosity through time to a transport property through time; and
    using the mathematical relationship to calculate the transport property through time.

6. The method of claim 5, wherein the transport property is capillary threshold entry pressure through time or thermal conductivity through time.

7. A method for calculating a transport property for a subsurface region from derivative seismic data, the method comprising:
    determining a model of clay volume fraction $V_{CLAY}$ from seismic reflection data;
    determining a plurality of different lithofacies categories associated with the $V_{CLAY}$ model;
    converting the $V_{CLAY}$ model to a plurality of grain-size distributions, each tied to a different lithofacies category, and associating clay, silt, and sand each with a different grain size;

determining a compaction model using the grain-size distributions;

using the compaction model to relate porosity to effective stress through time, and from that determining porosity through time using a stress history of the subsurface region;

generating a mathematical relationship relating porosity through time to a transport property through time; and using the mathematical relationship to calculate the transport property through time.

8. The method of claim 7, wherein the transport property is permeability.

* * * * *